United States Patent
Lipscomb et al.

(10) Patent No.: US 8,763,557 B2
(45) Date of Patent: Jul. 1, 2014

(54) PET FOUNTAIN ASSEMBLY

(75) Inventors: John M. Lipscomb, Cedarburg, WI (US); Qing He, North Andover, MA (US)

(73) Assignee: Pioneer Pet Products, LLC, Cedarburg, WI (US)

( * ) Notice: Subject to any disclaimer, the term of this patent is extended or adjusted under 35 U.S.C. 154(b) by 0 days.

(21) Appl. No.: 13/310,753

(22) Filed: Dec. 3, 2011

(65) Prior Publication Data
US 2013/0087102 A1 Apr. 11, 2013

Related U.S. Application Data

(63) Continuation-in-part of application No. 13/276,580, filed on Oct. 19, 2011, which is a continuation-in-part of application No. 29/403,434, filed on Oct. 6, 2011, which is a continuation-in-part of application No. 29/403,435, filed on Oct. 6, 2011, now Pat. No. Des. 659,301.

(51) Int. Cl.
*A01K 7/00* (2006.01)

(52) U.S. Cl.
USPC .......................................................... 119/74

(58) Field of Classification Search
USPC ........ 119/72, 72.5, 73, 75, 76, 69.5; 137/560; 47/65.5, 66.7
See application file for complete search history.

(56) References Cited

U.S. PATENT DOCUMENTS

| | | |
|---|---|---|
| 3,409,223 A | 11/1968 | Gosh |
| 3,901,439 A | 8/1975 | Willis |
| 4,217,315 A | 8/1980 | Keeler, II |
| 4,976,220 A | 12/1990 | Gershman |
| 5,167,368 A | 12/1992 | Nash |
| 5,501,178 A | 3/1996 | Kemp |
| 5,799,609 A | 9/1998 | Burns et al. |
| 5,842,437 A | 12/1998 | Burns |
| 6,055,934 A | 5/2000 | Burns et al. |
| 6,206,298 B1 | 3/2001 | Ting |
| 6,405,937 B1 | 6/2002 | Stukenberg |
| 6,460,483 B1 | 10/2002 | Northrop et al. |
| 6,527,257 B1 | 3/2003 | Schuld |
| 6,622,657 B2 | 9/2003 | Northrop et al. |
| 7,731,841 B1 | 6/2010 | Tennyson, Jr. |
| 7,958,844 B1 | 6/2011 | Northop |
| 8,171,885 B1 * | 5/2012 | Northrop et al. ................. 119/74 |
| 8,439,279 B2 * | 5/2013 | Barnhill .......................... 239/17 |
| 2005/0166853 A1 | 8/2005 | Plante |
| 2006/0174838 A1 | 8/2006 | Plante |
| 2010/0300366 A1 | 12/2010 | Lipscomb et al. |
| 2011/0067638 A1 | 3/2011 | Lipscomb et al. |
| 2011/0259273 A1 | 10/2011 | Lipscomb et al. |

* cited by examiner

*Primary Examiner* — Rob Swiatek
*Assistant Examiner* — Ebony Evans
(74) *Attorney, Agent, or Firm* — Boyle Frederickson S.C.

(57) ABSTRACT

A pet fountain that presents circulating water that is continuously filtered and pumped through the fountain. The fountain includes a basin that has a sidewall extending upwardly from a bottom wall (or floor) and a cover. A pump assembly is housed between the basin and cover, and circulates water through the pet fountain by pumping the water from the basin to an upper drinking bowl of the cover. The water spills out of the upper drinking back to the basin. An opening is provided between the cover and the basin which allows a pet to drink directly from the basin in addition to the upper drinking bowl of the cover.

45 Claims, 5 Drawing Sheets

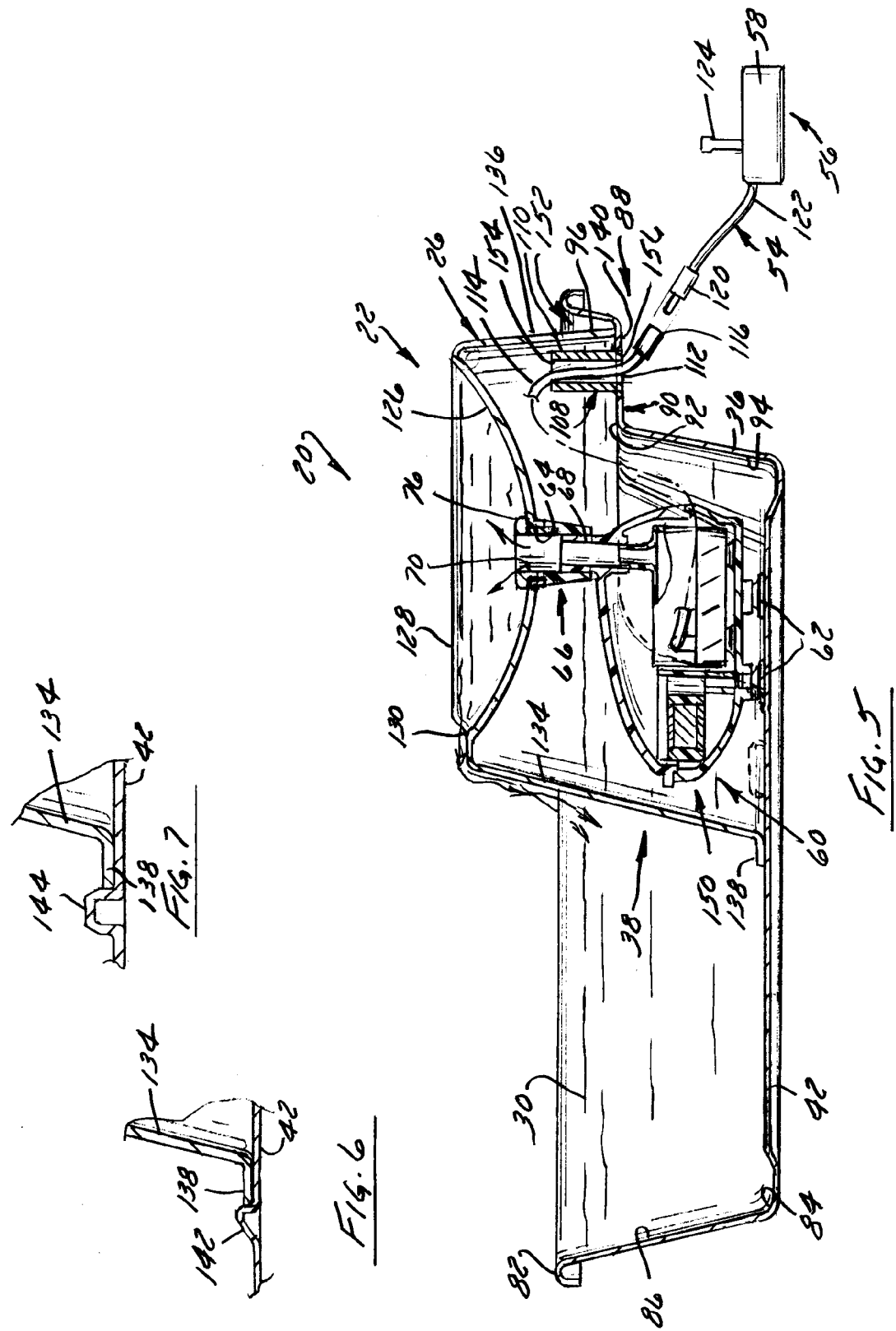

PET FOUNTAIN ASSEMBLY

CROSS-REFERENCE

This application is a continuation in part of U.S. patent application Ser. No. 13/276,580 filed Oct. 19, 2011, and of U.S. Design Application Nos. 29/403,434 and 29/403,435, filed Oct. 6, 2011, the entirety of each of which is hereby expressly incorporated herein by reference.

FIELD

The present invention relates generally to pet fountains and, more particularly, to a pet fountain assembly having a cover for use with a basin that includes a feature that resists lateral movement of the cover relative to the basin.

BACKGROUND

Pet fountains that create flowing water for attracting pets are well known and there have been a number of commercially successful pet fountains. Exemplary pet fountains generally include a spout or other water-directing means for providing a continuous flow of water from a reservoir to a container such that the pet is able to drink either directly from the flowing water stream or from the container.

Other known pet fountains utilize multiple containers that are connected to each other at respective sides, or openings through such sides, to create a chain or series of containers arranged in a decreasing height order. This allows water to be pumped to the tallest container and then flow, by way of gravity, through the multiple containers, sequentially until the water is collected in the lowermost container. Such pet fountains can occupy a large amount of floor space since the multiple containers typically define an, at least somewhat, overall elongate structure. Some such pet fountains occupy relatively less floor space, but are rather tall and are configured to look like, for example, mountains or other geological forms, which may not fit with some modern or other decors.

Pet fountains use electronic pumps to draw water from the container and push the water through, at times a filter and then, the spout. Typical pumps have a grate or grill-like inlet and/or an integrated porous material.

One of the drawbacks of conventional pet fountains, such as those described above, is the complexity in their design. In the past, pet fountains have been made of so many components that washing and maintenance have been time consuming and burdensome. As a result, many pet fountains are used for a while by their owners before they quit using them because they are simply too difficult to clean. Many improvements have been made to pet fountains but they still tend to be difficult to clean.

As a result, efforts have been made to design and manufacture pet fountains formed of a minimum of components, which are easy to assemble, take apart, clean and reassemble, and which facilitates simple and easy electric pump cord routing. For example, one proposed pet fountain is composed of a basin for holding a volume of water and a cover that sits atop the basin. The cover has a recessed portion that forms a drinking bowl for holding a smaller volume of water which, in combination with the basin, provides two different water supplies from which a pet may drink. In some instances, a pump is contained beneath the cover and is operative to draw water from the basin and pump it to the drinking bowl of the cover. As the volume of water pumped to the cover exceeds the holding capacity of the drinking bowl, water begins to waterfall from the cover back into the basin.

To provide consistent operation, it is important that the cover remains properly seated atop the basin, If the cover, especially a cover that has a drinking bowl, becomes dislodged, water may fall onto the floor if knocked by a pet, for example. Thus, in addition to an easy-to-assemble and economical pet fountain, there is a need for a pet fountain in which the cover securely, yet removably interfaces with the basin.

SUMMARY

The present invention is directed to a pet fountain that presents circulating water that is continuously filtered and pumped through the fountain. The fountain includes a basin that has a sidewall extending upwardly from a bottom wall (or floor) and a cover that is supported by the basin. A pump assembly that can include just a pump is housed between the basin and cover, and circulates water through the pet fountain by pumping the water from the basin to an upper drinking bowl of the cover. The water spills out of the upper drinking back to the basin.

An opening is provided between the cover and the basin which allows a pet to drink directly from the basin in addition to the upper drinking bowl of the cover.

In one embodiment, the fountain can include a conduit through which an electrical cord of the pump assembly passes outside of the pet fountain. The conduit can be connected to a shelf that extends, for example, outwardly from the basin sidewall. In a preferred embodiment, the conduit includes an uprightly extending tubular member that extends from an upper surface of the ledge. The tubular member has an elongate hollow interior through which the electrical cord of the pump assembly may pass. The tubular member is spaced slightly from the top portion of the basin sidewall that extends above the shelf to allow the cover to fit between the tubular member and the basin sidewall, In addition to providing a sleeve through which the electrical cord can pass, the tubular member also limits lateral movement of the cover when the cover is seated on the basin.

The fountain can include a basin drinking opening defined by a portion of the cover spaced from part of the basin sidewall exposing the interior of the basin along with water in the basin in a manner permitting a pet to drink therefrom. The drinking opening between the basin and cover is sized and configured to accommodate at least a portion of a head of a pet therein. The opening can define an area value that is at least about ⅛ of the total area of the pet fountain when viewed from a top plan view of the pet fountain. The opening can define an area that is less than about ½ of the total area of the pet fountain when viewed from a top plan view of the pet fountain. The width of the opening may vary along the length of the opening, from a wider portion to a tapering portion and the opening can be generally asymmetrical.

The fountain cover can be formed with a drinking bowl in fluid flow communication with a pump or pump module disposed between the basin and cover that allows water pumped by the pump from the basin to be delivered to the bowl where the water can be drank by a pet, e.g., cat or dog. The cover has a top wall in which the bowl is formed and includes a notched portion that allows water to flow out of the drinking bowl and downwardly along a spillway formed by the sloped sidewall of the cover back into the basin.

The fountain includes a pump that couples with a coupling tube attached to the cover prior to mounting of the cover to the basin. During mounting of the cover onto the basin, the respective seats of the basin and cover locate the cover relative to the basin. As the cover is brought toward the basin, the coupling tube is located relative to a discharge of the pump such that the end of the tube generally coaxially and telescopically receives part of the discharge. When the cover is received on the basin when cover mounting is complete and the coupling tube in telescoping engagement with the pump discharge, the engagement between the tube and pump discharge anchors the cover to the basin thereby helping to hold the cover against the basin.

In a preferred embodiment, the pump is part of a pump assembly that is of modular construction having a housing with an outlet nipple in fluid-flow communication with the pump discharge that telescopically couples with the coupling tube. The pump assembly can include a filter, such as a replaceable modular filter, and can be disassembled, such as when it is desired to remove and replace the filter.

In one preferred embodiment, the bowl and pump form a pet fountain bowl module or assembly that can be pre-packaged for retail sale for use with a customer or user-supplied basin. In another preferred embodiment, the bowl, pump, and basin are packaged and sold as a pet fountain assembly. While the basin can be a round bowl or dish, one preferred basin embodiment includes an outwardly offset pump well that provides a pump seat enabling location of the pump during fountain assembly. In one embodiment, the pump is housed in a pump module that can include a filter. The pump or pump module can be releasably coupled by a liquid-conveying coupling conduit that can be of flexible, resilient, and elastomeric construction.

These and various other features, aspects, and advantages of the present invention will be made apparent from the following descriptions of the drawings and detailed description.

DRAWING DESCRIPTION

The drawings illustrate at least one preferred embodiment presently contemplated for carrying out the invention. In the drawings:

FIG. 5 is a cross-sectional view of the fountain.

FIG. 6 is a first enlarged cross-sectional view of the fountain assembly.

FIG. 7 is a second enlarged cross-sectional view of a fountain assembly according to another embodiment of the invention.

Figure 1:
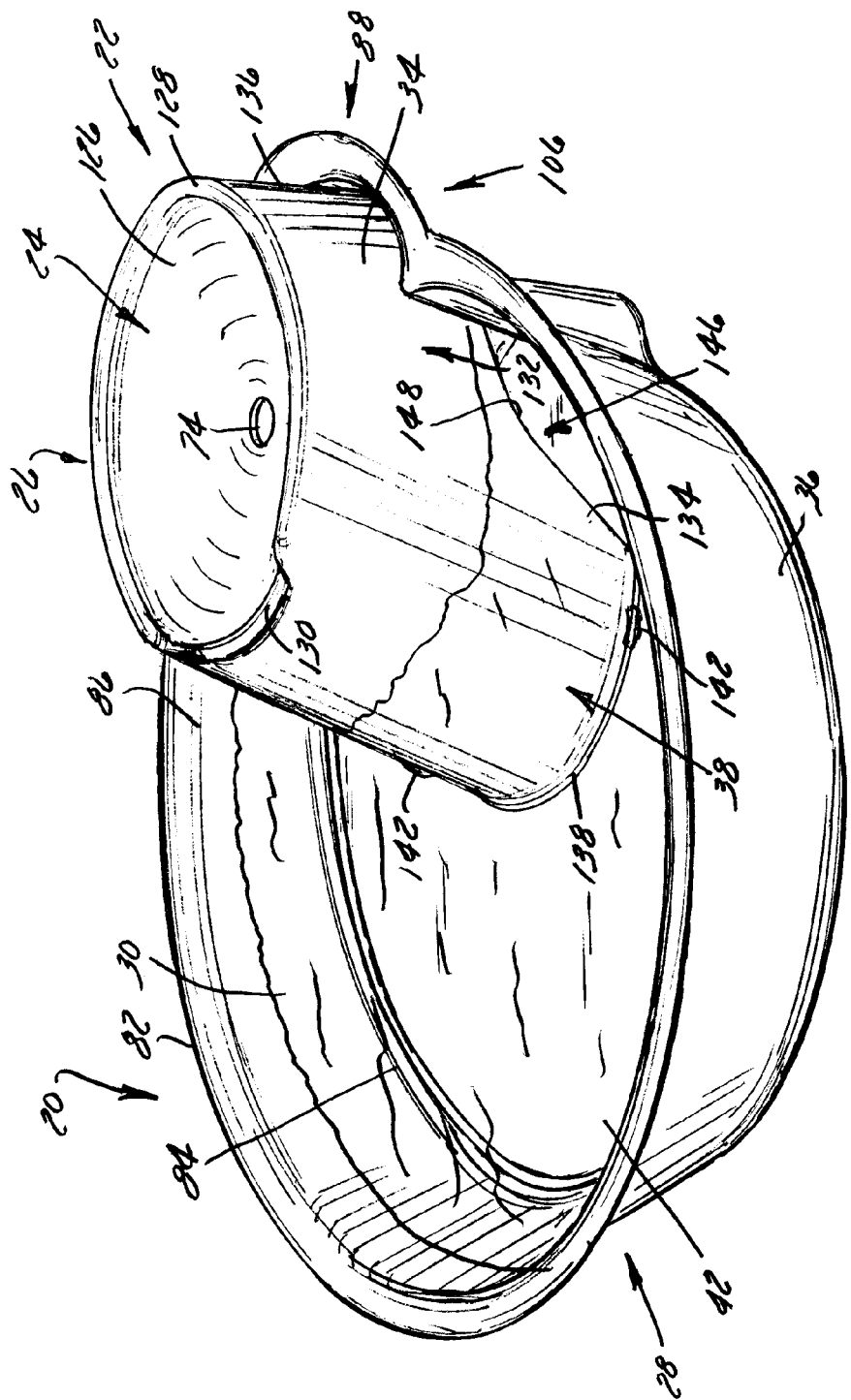
FIG. 1 is a perspective view of a pet fountain formed of an assembly that includes a bowl and a basin.

Before explaining one or more embodiments of the invention in detail, it is to be understood that the invention is not limited in its application to the details of construction and the arrangement of the components set forth in the following description or illustrated in the drawings. The invention is capable of other embodiments, which can be practiced or carried out in various ways. Also, it is to be understood that the phraseology and terminology employed herein is for the purpose of description and should not be regarded as limiting.

DETAILED DESCRIPTION

Figure 2:
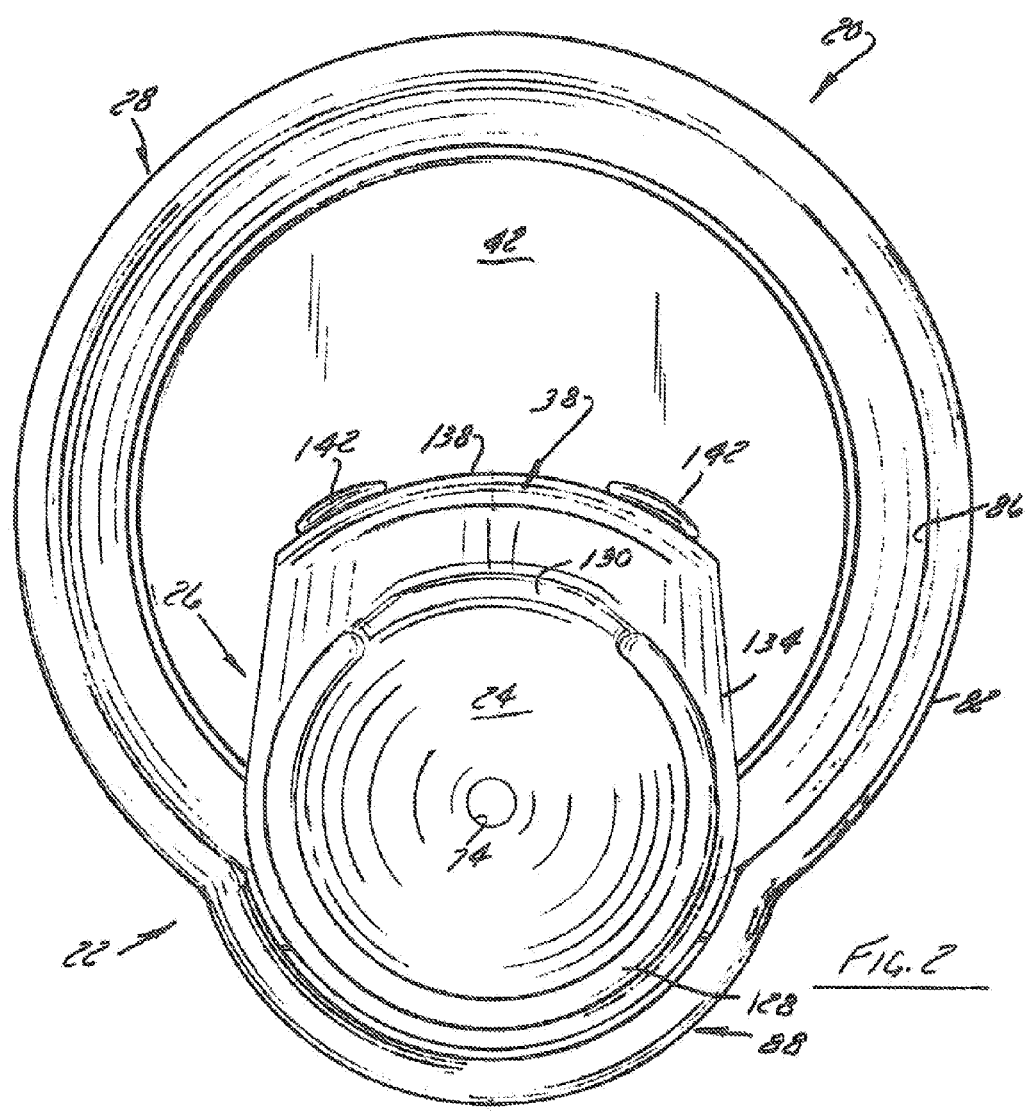
FIG. 2 is a top plan view of the fountain.
Figure 3:
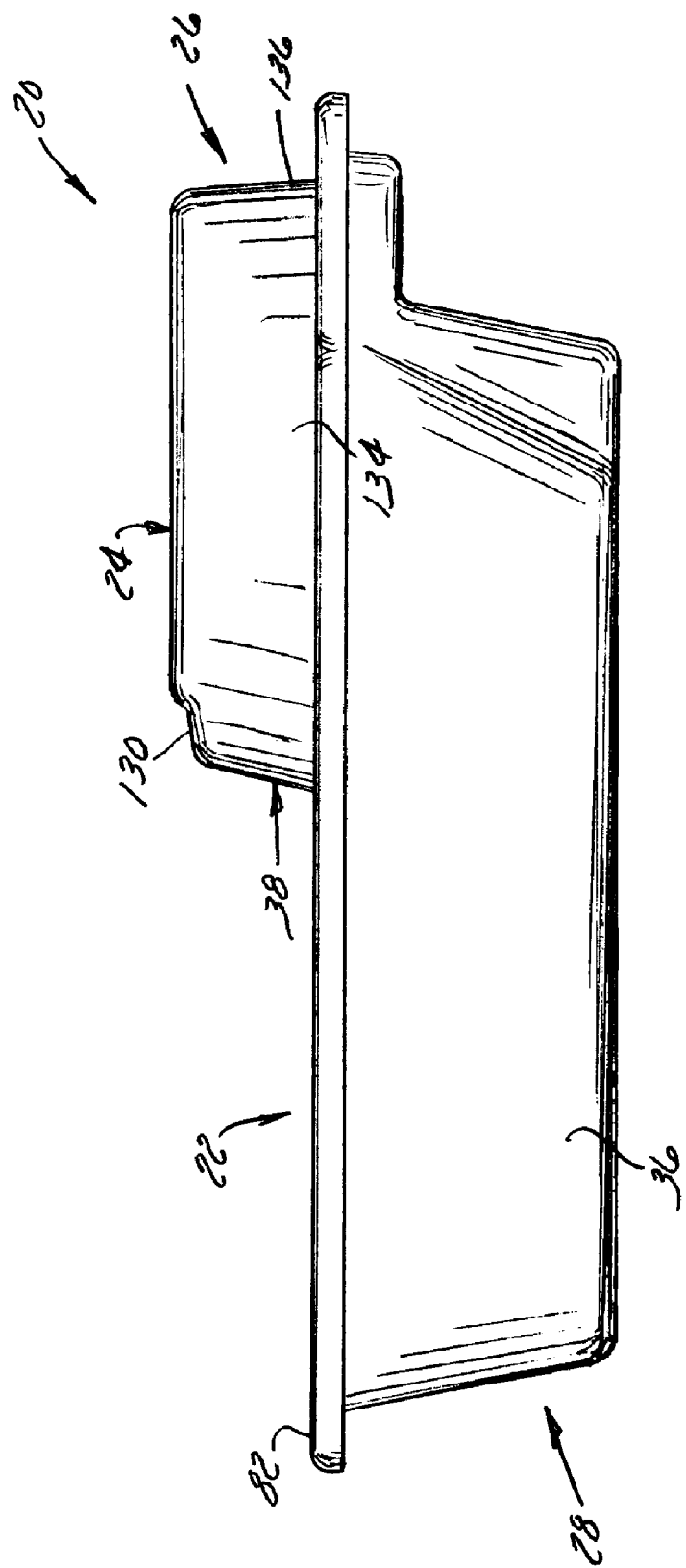
FIG. 3 is a side elevation view of the fountain.

Referring now to FIGS. 1-3, a recirculating pet fountain 20 is defined by a fountain assembly 22 that includes an upper drinking bowl 24 integrally formed in a fountain cover 26 that seats in a basin 28 that holds water 30 from which a pet, such as a cat or dog, can drink. The drinking bowl 24 receives water 30 pumped by a pump 32 (FIG. 4) from the basin 28 enabling the pet to drink from water 30 in the bowl 24 or from water 30 in the basin 28. The cover 26 has a sidewall 34 extending downwardly from the drinking bowl 24 that is configured to seat within the basin 28 and thus inboard of an upwardly extending basin sidewall 36 in a manner that locates the pump 32 within the basin 28 and substantially encloses the pump 32. During operation, the pump 32 recirculates water 30 by pumping it from the basin 28 into the drinking bowl 24 in the cover 26 where it then flows down a spillway 38 formed by part of the cover sidewall 34. Water 30 flowing down the spillway 38 flows into an open portion of the basin 28 that defines a lower drinking bowl 40 from which the pet can also drink.

In a preferred embodiment, the spillway 38 is inclined at an angle relative to the basin bottom 42 so that water 30 overflowing from the bowl 24 quietly flows down the spillway 38 into the basin 28 below. For example, the spillway 38 can form an obtuse included angle with the generally horizontal basin bottom 42 helping ensure overflowing water 30 flows smoothly and preferably with laminar flow into the basin 28.

Figure 4:
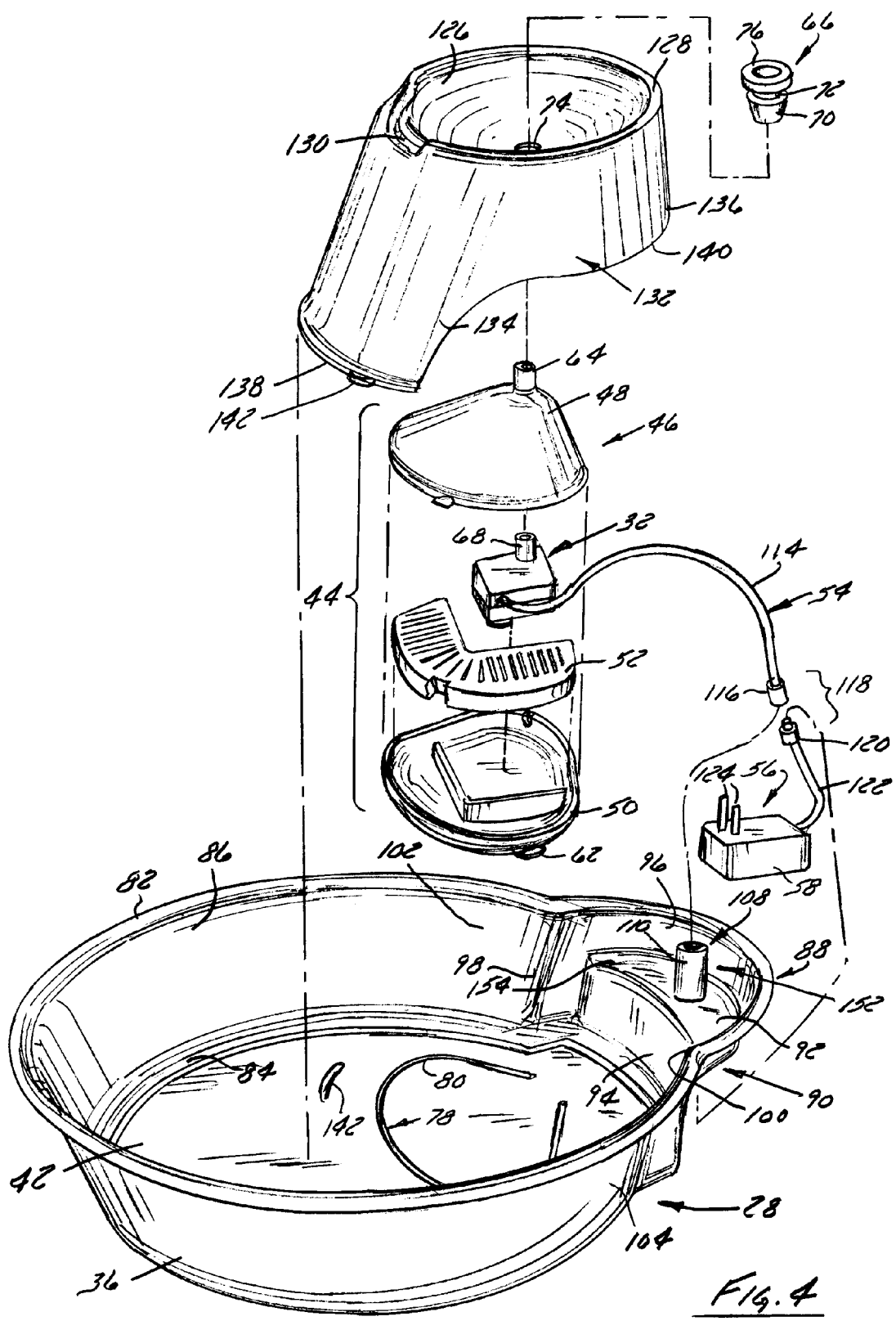
FIG. 4 is a perspective exploded view of the fountain assembly.

With reference to FIGS. 4-5, the pump 32 can be part of a pump module 44 having a housing 46 that can be formed of a plurality of snap-together sections, e.g., top half section 48 and a bottom half section 50, which can include a filter 52. Such a filter 52 can filter particulates and can include activated charcoal or the like. The pump 32 is a submersible electrically powered pump, such as a submersible aquarium pump or the like. The pump 32 includes an electrical cord 54 that is routed between the cover 26 and the basin 28 when the pet fountain 20 is assembled. The electrical cord 54 terminates in a dual-pronged plug 56, which can include a transformer 58, that is plugged into a standard utility powered electrical socket providing electrical power ranging from between about 60 VAC and about 240 VAC. One of the module housing sections, such as the bottom half section 50, can be formed to include an integral perforate intake grate 60 (FIG. 5) through which water 30 in the basin 28 flows before being pumped by the pump 32 into the drinking bowl 24 of the cover 26. Mounts 62, such as suction cups, can be used to removably attach the pump module 44 to the bottom 42 of the basin 28. Such mounts 62 can be in the form of flexible and resilient suction cups, e.g., elastomeric suction cups, which can extend outwardly from bottom half section 50.

The top half section 48 includes an outwardly extending tubular outlet 64 that telescopically engages a flexible, elastomeric coupling conduit 66 that not only conveys water discharged by the pump 32, but which also releasably couples the cover 26 to the pump 32, e.g., pump module 44. Where the pump 32 is used without a pump module 44, the coupling conduit 66 telescopically engages a tubular outlet 68 of the pump 32.

The coupling conduit 66 can be formed of a flexible and resilient material, e.g., an elastomer, which includes a tubular body 70 with an annular seating channel or groove 72 in registry with part of the drinking bowl 24 that defines an opening 74 sealed by a lip 76 of the coupling conduit 66 when attached to the cover 26. When the pump module 44 is attached to the basin bottom 42 and the coupling conduit 66 is coupling the cover 26 to the pump module 44, the cover 26 is removably anchored to the basin 28 while also helping locate the cover 26 relative to the basin 28. Where the coupling conduit 66 is attached directly to the pump 32, such as when the pump 32 is used without any pump module or pump module housing, the pump 32 has mounts, e.g., suction cups, which attach to the basin bottom 42 and the coupling conduit 66 removably anchors the cover 26 to the pump 32.

The basin bottom 42 has a pump locator seat 78 configured to locate the pump module 44 during assembly of the pet fountain 20. The pump locator seat 78 is a pump locator formed in a top surface (not numbered) of the basin bottom 42, such as by being molded or pressed into the basin bottom 42, having a perimeter shape that corresponds to that of the pump module 44. The pump locator seat 78 shown in the drawings is defined by a rib 80 molded into basin bottom 42. The portion of the basin bottom 42 lying within the boundary defined by pump locator seat 78 can be recessed relative to the basin bottom 42 surrounding or encompassing the pump locator seat 78. Where recessed, the pump locator seat 78 can define a depression formed in the basin bottom 42 having a perimeter shape corresponding to that of the pump module 44 and configured to allow water to flow around and underneath the pump module 44. In use, the pump locator seat 78 indicates where a user of the pet fountain 20, such as a purchaser of the pet fountain 20, is to attach the pump module 44 to the basin bottom 42 during fountain 20 assembly.

The basin sidewall 36 extends upwardly from the basin bottom 42 and has a generally curved cross-section such that its top edge 82 is disposed outwardly of its bottom, e.g., sidewall bottom edge 84, where the basin sidewall 36 intersects the basin bottom 42. Such an outwardly curved cross-section smoothly guides water falling on an inner surface 86 of the sidewall 36 downwardly toward the pump module 44 in a manner that minimizes and preferably substantially prevents splashing.

The basin 28 has a radial portion 88 that extends outwardly from the basin sidewall 36 to define a cover seating portion 90 upon which a portion of the cover sidewall 34 sits when the pet fountain 20 is assembled. The cover seating portion 90 generally consists of a shelf 92 that extends outwardly from an upper edge of an endwall 94 to convex surface 96 of the radial portion 88. The endwall 94 extends uprightly from the basin bottom 42 and is outward of the ends 98, 100 of respective converging wall members 102, 104, respectively, of the basin sidewall 36. As best shown in FIG. 4, the radial portion 88 is located between the ends 98, 100 of the wall members 102, 104. A cord clearance space 106 is defined exteriorily of the pet fountain 20 and beneath the radial portion 88, which can be seen in FIG. 5. The curvature of the curved surface 96 is generally matched to the curvature of the cover sidewall 34, which allows the cover 26 to fit nicely and snuggly in the basin 28.

Formed opposite the cord clearance space 106 is a cord conduit 108 that underlies part of the fountain cover 26 when the cover is properly seated on the basin. The cord conduit 108 includes a section of tubing 110 in communication with an opening 112 through the shelf 92 that enables the electrical cord 54 connected to the pump 32 to be routed through the cord conduit 108 and out of the basin 28. The electrical cord 54 is shown in FIG. 5 as having one cord segment 114 that extends from the pump module 44 inside the fountain assembly 22 through the cord conduit 108 and out the basin 28 terminating in one half 116 of an electrical connector 118 that removably connects to an opposite half 120 of the electrical connector 118 that is attached to a second cord segment 122 connected to a transformer 58 having prongs 124 coverable of being plugged into an electrical outlet having a voltage ranging from 110 volts alternating current (110 V AC) to 220 volts alternating current (220 V AC).

With reference to FIG. 5, the cover 26 has a top wall 126 of recessed or concave construction integrally forming the drinking bowl 24. The drinking bowl 24 is defined by an upraised rim 128 about its periphery interrupted by a recessed flow guide 130 that guides water 30 overflowing from the drinking bowl 24 down the spillway 38 into the basin 28 below. The cover sidewall 34 extends downwardly from the top wall 126 defining a stand 132 for seating the cover 26 on the basin 28, as will be described more fully below. The cover sidewall 34 is divided into a plurality of supports, e.g., an angled support 134 and a vertical support 136. The angled support 134 is longer and thus extends farther from the top wall 126 than the vertical support 136. The angled support 134 has an arcuate foot 138 that sits against the basin bottom 42 when the cover 26 is seated in the basin 28. In a similar manner, the vertical support 136 has an arcuate foot 140 that rests atop the shelf 92. The basin bottom 42 has a pair of raised stops 142 against which the arcuate foot 138 of the angled support 134 abuts when the pet fountain 20 is assembled. FIG. 6 shows one construction of the raised stops 142 and the engagement with the arcuate foot 138 of the angled support 134. FIG. 7 shows the construction of a raised stop 144 according to another embodiment of the invention.

As will be explained in further detail below, the raised stops 142 (or 144) together with other features of the pet fountain 20 limit lateral movement of the cover 26 when the pet fountain 20 is assembled.

The construction of the cover 26, and more particularly, the supports 134, 136, creates a pair of openings of which opening 146 is only visible in the figures. The openings are generally opposite one another and are each defined by a concave edge 148 that extends between arcuate foot 138 and arcuate foot 140 and overlays a portion of the basin bottom 42. The difference in height between the angled support 134 and the vertical support 136 results in a portion of the concave edge 148 seating on the shelf 92. The pair of openings allow water 30 to be drawn from the lower drinking bowl 40 by the pump 32 into a pumping chamber 150 and pumped to the drinking bowl 24 in a manner as described above.

In the preferred fountain embodiment shown in the drawings, the vertical support 136 can be transversely formed, e.g., curved, so as to substantially complementarily conform or follow the contour of at least part of an adjacent portion 96 of the basin sidewall 36. The angled support 134 encompasses or overlies part of the pump 32, e.g., pump module, so as to help house or enclose it within the cover 26. if desired, the angled support 134 can also be formed, e.g. curved, so as to substantially complementarily conform or follow part of the contour of the pump module 44. For example, as is depicted in the drawing figures, the cover 26 can be generally round with the cover sidewall 34 being generally round extending downwardly and interrupted by basin sidewall receiving opening 146 that divides the sidewall 34 into the angled support 134 and vertical support 136 and basin bottom 42 upon which the cover 26 rests when assembled.

During assembly, the coupling conduit 66 is inserted into the opening 74 in the top wall 126 of the drinking bowl 24 until part of the bowl 24 defining the opening 74 seats in the channel 72 attaching the conduit 66 to the cover 26. The pump 32 or pump module 44 is maneuvered into the pump locator seat 78 until its mounts 62, e.g., suction cups, engage the basin bottom 42 releasably securing the pump 32 or pump module 44 in place.

The cover 26 is maneuvered over the pump 32 or pump module 44 with its supports 134, 136 facing downwardly. As the cover 26 is lowered, a portion of the vertical support 136 is lowered in a gap 152 defined between the curved surface 96 of the radial portion 88 of the basin 28 and the cord conduit 108 that extends uprightly from the shelf 92. The width of the gap 152 is slightly more than the thickness of the sidewall 34 of the cover to allow the sidewall 34 to be removably received yet limit lateral movement of the cover 26 when the pet fountain 20 is assembled. In one embodiment, the gap 152 is sized to have a width of approximately one-quarter inch. When the cover 26 is in the lowered position, such as shown in FIG. 5, the arcuate foot 138 of the angled support 134 rests against raised stops 142, which also limits lateral displacement of the cover 26 when the pet fountain 20 is assembled. It is understood that the pet fountain 20 could be equipped with a basin 28 having a basin bottom 42 absent the afore-described stops. In such an embodiment, the cooperation of the basin sidewall 36 and the cord conduit 108 limits lateral movement of the cover 26 relative to the basin 28.

While the gap 152 is sized to limit lateral displacement of the cover 26, the width of the gap 152 provides sufficient amount of play between the cover 26 and basin 28 during assembly to enable a user to be able to move the cover 26 toward or away from the basin sidewall 34 as needed in order for the coupling conduit 66 to telescopically engage the tubular outlet 68 of the seated pump 32 and/or pump module 44. When the coupling conduit 66 telescopically engages the tubular outlet 68 of the seated pump 32 and/or pump module 44, the cover 26 can be lowered as desired until the angled support 134 rests on the basin bottom 42 and the vertical support 136 rests on the shelf 92.

With the cover 26 coupled by the coupling conduit 66 to the pump 32 or pump module 44 that is in turn mounted to the basin bottom 42, the cover 26 is anchored to the basin 28 completing fountain assembly. Once water 30 is added to the basin 28 and the pump 32 plugged into an electrical outlet (not shown), the pump 32 draws water 30 from the lower drinking bowl 40 of the basin 28 through one or both passage openings 146 between the cover 26 and the basin bottom 42. Water 30 from the pumping chamber 150 is expelled out the coupling conduit 66 into the drinking bowl 24 where it pools until the water 30 overflows down the spillway 38 formed by the outer surface of the angled support 134.

Referring again to FIG. 5, the cord conduit 108 has a section of tubing 110 with a first open end 154 that communicates with the interior of the basin 28 and an opposite second open end 156 that communicates exteriorly of the basin 28. The height of the section of tubing 110 is preferably selected so that the first open end 154 terminates at a height that is higher than the maximum fill level of the basin 28, which corresponds to the top edge 82 of the basin sidewall 36. Having the height of the section of tubing 110 above the top edge 82 of the basin sidewall 36 prevents the ingress of water 30 into the section of tubing 110 during normal operation. Alternately, it is contemplated that a gasket or other seal could be placed at the first open end 154 of the section of tubing 110 to prevent the ingress of water 30 into the section of tubing 110.

In a preferred embodiment, the cover 26 and basin 28 are formed of porcelain providing additional weight to the cover 26 that can help to keep the cover 26, as well as the pump 32, e.g., pump module 44, in place during pump operation. It is understood however that the pet fountain 20 could be formed of other materials, such as stainless steel, plastic, etc.

While the preferred fountain embodiment shown in the drawings depicts the pump 32 disposed in a housing 46 of a pump module 44, a pet fountain 20 constructed in accordance with the present invention can be used where the pump 32 is not disposed in any module or housing or is disposed in a module having a different shape or configuration.

Understandably, the present invention has been described above in terms of the preferred embodiment. It is recognized that various alternatives and modifications may be made to these embodiments which are within the scope of the appended claims.

What is claimed is:

1. A pet fountain assembly comprising:
   a water-holding basin having a bottom and an upwardly extending sidewall;
   a post extending from the water-holding basin;
   a cover having a drinking howl in water flow communication with the basin, and having a cover sidewall fit between the upwardly extending basin sidewall and the post; and
   a pump in water flow communication with the basin and the drinking bowl; and
   wherein the basin further includes a raised shelf and wherein the post extends from the shelf.

2. The pet fountain assembly of claim 1 wherein the raised shelf extends generally outwardly from the basin sidewall.

3. The pet fountain assembly of claim 1 wherein the post has a tubular body having a first open end in communication with an interior of the basin and a second open end in communication with an exterior of the basin.

4. The pet fountain assembly of claim 3 further comprising an electrical cord having a first end connected to the pump and a second end having a power block for coupling to a power source, and wherein a portion of the electrical cord is passed through the tubular body.

5. The pet fountain assembly of claim 4 wherein the raised shelf defines a cord clearance space underneath at least part of the raised shelf that is located outside the basin and the cover.

6. The pet fountain assembly of claim 1 wherein the post comprises a cord conduit, and further comprising an elongate electrical cord passing through the cord conduit, the electrical cord electrically connecting the pump to a step-down transformer disposed outside the pet fountain assembly, and the electrical cord comprised of a pair of electrical cord segments removably connected together by an electrical connector.

7. The pet fountain assembly of claim 6 wherein the raised shelf defines a cord clearance space underneath at least part of the raised shelf, and wherein the cord clearance space is disposed outside the basin and the cover and in communication with the cord conduit.

8. The pet fountain assembly of claim 1 wherein the cover comprises a plurality of spaced apart and generally downwardly extending supports with one of the supports comprising an angled support disposed in the basin and another one of the supports comprising a vertical support disposed in the basin and generally overlying the shelf.

9. The pet fountain assembly of claim 8 wherein the angled support comprises a foot resting on the bottom of the basin and the vertical support comprises a foot resting on the shelf.

10. The pet fountain assembly of claim 8 wherein the angled support comprises a spillway down which water overflowing the drinking bowl flows into the basin.

11. The pet fountain assembly of claim 8 wherein the angled support is longer than the generally vertical support.

12. The pet fountain assembly of claim 1 wherein the cover overlies the pump with at least part of the cover sidewall is disposed alongside the pump defining a pumping chamber together with part of the basin, wherein one part of the cover sidewall disposed in the basin overlying the basin bottom is longer than another part of the cover sidewall overlying the raised shelf, and wherein a portion of the one part of the cover sidewall disposed in the basin is s spaced from an adjacent art of the basin sidewall defining an opening therebetween through which water in the basin flows into the pumping chamber and to the pump.

13. The pet fountain assembly of claim 1 wherein one portion of the cover sidewall overlies the basin bottom, wherein another portion of the cover sidewall overlies the raised shelf, and wherein the cover comprises a spillway along which water can flow into the basin.

14. The pet fountain assembly of claim 13 wherein the cover further includes a top edge defining at least part of the drinking bowl, and wherein a portion of the top edge is recessed and in water flow communication with the spillway directing water overflowing the drinking howl onto the spillway.

15. The pet fountain assembly of claim 1 further comprising an opening formed between the cover and the basin, wherein the pump is disposed between the cover and basin, and wherein the opening is in water flow communication with a fluid intake of the pump allowing water in the basin to flow through the opening between the cover and the basin into the fluid intake of the pump.

16. The pet fountain assembly of claim 1 wherein the pump is coupled to the cover by a coupling conduit in water flow communication therewith.

17. The pet fountain assembly of claim 16 wherein the coupling conduit is comprised of a flexible elastomeric material.

18. The pet fountain assembly of claim 16 wherein the pump is received in a pump module housing in telescopic engagement with the coupling conduit.

19. The pet fountain assembly of claim 1 wherein the basin and the cover are each made from steel.

20. The pet fountain assembly of claim 1 wherein the basin and the cover are each made from plastic.

21. The pet fountain assembly of claim 1 wherein the cover sidewall extends downwardly from the drinking bowl having one part of the cover sidewall disposed in the basin overlying the basin bottom that is longer than another part of the cover sidewall overlying the raised shelf.

22. A pet fountain assembly comprising:
 a water-holding basin having a bottom and an upwardly extending sidewall;
 a cover-supporting shelf adjacent the water-holding basin;
 a submersible pump disposed in the basin;
 a cover having a spillway in water flow communication with the pump, the cover having a downwardly extending sidewall comprising a plurality of supports for supporting the cover thereon when the cover is mounted to the basin, wherein one of the supports comprising a first cover support disposed inside the basin and overlying the basin bottom and another one of the supports comprising a second cover support that seats in or on the cover-supporting shelf.

23. The pet fountain, assembly of claim 22 wherein the cover-supporting shelf (a) is integrally formed with the water-holding basin, and (b) is comprised of a part of the basin sidewall that extends generally outwardly of the basin bottom at a height higher than the basin bottom.

24. The pet fountain assembly of claim 22 wherein the cover-supporting shelf is in fluid communication with the water-holding basin, and wherein the cover further comprises a drinking bowl.

25. The pet fountain assembly of claim 22 further comprising a post extending uprightly from the cover-supporting shelf, wherein the post limits lateral movement of the cover relative to the basin when the second cover support is seated in or on the cover-supporting shelf.

26. The pet fountain assembly of claim 25 wherein the post comprises a tubular member having a first end that opens underneath part of the cover and a second end that opens to the exterior of the pet fountain assembly.

27. The pet fountain assembly of claim 26 wherein the tubular member comprises a cord conduit, and further comprising an electrical cord connected to the submersible pump and having a portion of the electrical cord passing through the cord conduit.

28. The pet fountain assembly of claim 22 wherein the first cover support defines at least a portion of the spillway down which water flows into the basin.

29. The pet fountain assembly of claim 22 wherein the first cover support is longer than the second cover support.

30. The pet fountain assembly of claim 22 wherein the first cover support rests directly on the basin bottom and the second cover support rests directly on the cover-supporting shelf.

31. The pet fountain assembly of claim 22 wherein part of the cover overlies the submersible pump, and wherein the first cover support is spaced from the basin sidewall defining an opening therebetween that allows water in the basin to be drawn through the opening and into the submersible pump.

32. The pet fountain assembly of claim 22 wherein the cover-supporting shelf comprises an outwardly extending portion disposed underneath the cover that is located adjacent or alongside part of the second cover support limiting movement of the cover relative to the basin.

33. The pet fountain assembly of claim 32 wherein the outwardly extending portion comprises a cord conduit.

34. The pet fountain assembly of claim 22 wherein the cover-supporting shelf comprises a pair of spaced apart outwardly extending portions that straddle the second cover support seated in or on the cover-supporting shelf limiting movement of the cover relative to the basin.

35. The pet fountain assembly of claim 34 wherein one of the outwardly extending portions underlies the cover and the other one of the outwardly extending portions is disposed exteriorly of the cover.

36. The pet fountain assembly of claim 35 wherein one of the outwardly extending portions extends generally upwardly from the cover-supporting shelf.

37. The pet fountain assembly of claim 35 wherein each one of the outwardly extending portions extends generally upwardly from the cover-supporting shelf.

38. The pet fountain assembly of claim 22 wherein the cover-supporting shelf defines an electrical cord clearance space underlying at least a portion of the cover-supporting shelf that is disposed outside the basin and the cover.

39. The pet fountain assembly of claim 38 wherein the basin has an electrical cord opening formed therein disposed in communication with the electrical cord clearance space, and further comprising an elongate electrical power cord connected to the submersible pump disposed in the basin that passes through the cord opening into the electrical cord clearance space disposed outside the basin and the cover.

40. The pet fountain assembly of claim 22 wherein the cover-supporting shelf has a pair of spaced apart generally outwardly extending portions between which the second cover support is disposed when seated in or on the cover-supporting shelf with one of the generally outwardly extending portions comprising a generally upwardly extending portion of the basin sidewall disposed outwardly of the second cover support and the other one of the generally outwardly extending portions comprising a cord conduit that underlies part of the cover, wherein the cover-supporting shelf defines a cord clearance space underneath thereof that is disposed exteriorly of the basin and the cover, and wherein the cord conduit communicates with the cord clearance space.

41. A pet fountain assembly comprising:
 a water-holding basin having a bottom and an upwardly extending sidewall;
 a raised stop on the bottom of the water-holding basin;
 a cover-supporting shelf adjacent the water-holding basin;

a submersible pump disposed in the basin;

a cover having a spillway in water flow communication with the pump, the cover having a downwardly extending sidewall comprising a plurality of spaced apart supports for supporting the cover, wherein one of the supports comprising a first support disposed inside the basin and resting against the raised stop on the basin bottom and another one of the supports comprising a second support resting on the cover-supporting shelf.

42. The pet fountain assembly of claim 41 wherein the cover further comprises a drinking bowl.

43. The pet fountain assembly of claim 41 wherein the cover-supporting shelf defines an electrical cord clearance space underneath at least a portion thereof that is disposed exteriorly of the basin and the cover, wherein the basin has a cord opening formed therein that communicates with the electrical cord clearance space; and further comprising an electrical power cord connected to the submersible pump that passes through the cord opening to the electrical cord clearance space.

44. The pet fountain assembly of claim 41 wherein the cover-supporting shelf is formed of part of the basin sidewall that disposes at least part of the cover-supporting shelf at a height higher than the basin bottom, and wherein the cover-supporting shelf comprises a generally outwardly extending portion disposed alongside the second cover support that limits movement of the cover relative to the basin.

45. The pet fountain assembly of claim 44 wherein the cover-supporting shelf is comprised of a pair of the generally outwardly extending portions that straddle the second cover support therebetween limiting movement of the cover relative to the basin.

\* \* \* \* \*